US005729783A

United States Patent [19]

Depatie et al.

[11] Patent Number: 5,729,783

[45] Date of Patent: Mar. 17, 1998

[54] STRETCHED DIAPHRAGM APERTURE FOR AN OPTICAL SYSTEM

[75] Inventors: Jean F. Depatie, Albion; James A. Schmieder, Wayland, both of N.Y.

[73] Assignee: Eastman Kodak Company, Rochester, N.Y.

[21] Appl. No.: 786,071

[22] Filed: Jan. 21, 1997

[51] Int. Cl.[6] .......... G03B 9/02

[52] U.S. Cl. .......... 396/508; 396/227

[58] Field of Search .......... 396/505, 508; 359/227, 230, 231

[56] References Cited

U.S. PATENT DOCUMENTS

| | | | |
|---|---|---|---|
| 3,336,852 | 8/1967 | Levin | 359/230 X |
| 3,456,351 | 7/1969 | Gehmann | 359/227 X |
| 3,843,267 | 10/1974 | Vital et al. | 359/227 X |
| 4,910,739 | 3/1990 | Sheng | 359/227 X |
| 5,150,702 | 9/1992 | Miyanaga et al. | 128/6 |
| 5,589,906 | 12/1996 | Shimizu | 396/505 |

*Primary Examiner*—W. B. Perkey
*Attorney, Agent, or Firm*—David M. Woods

[57] ABSTRACT

An aperture mechanism for controlling the aperture of an optical system includes a flexible diaphragm having an opening at its center for forming a first aperture value for the optical system and means for stretching the diaphragm to enlarge the opening and form at least one additional aperture value for the optical system. A stepper motor is used to stretch the diaphragm to form a plurality of aperture values for the optical system. Because the size of the aperture is determined by how much the diaphragm is stretched, the backlash between the stepper motor and related gearing is kept to a minimum due to the elastic properties of the diaphragm, which provides economical and accurate control of very small apertures.

13 Claims, 6 Drawing Sheets

36
37
38
40
42
42
42
42
44
44
46
48
50
52
54
56
58
58
58
60
62

STRETCHED DIAPHRAGM APERTURE FOR AN OPTICAL SYSTEM

FIELD OF THE INVENTION

The invention relates generally to the field of photography, and in particular to apparatus for exposure control of photographic cameras.

BACKGROUND OF THE INVENTION

In both electronic and film cameras, the determination of ambient exposure level is used to select appropriate light-gathering parameters, such as aperture size and shutter time, to properly expose the light-gathering image receptor, whether it is an electronic sensor or a photographic film. Such parameters are controlled by a variety of aperture and shutter mechanisms. One type of aperture mechanism used to limit the amount of light allowed to pass through a camera lens allows fixed steps of control, with each step of control allowing a predetermined percentage of light (compared to full aperture) to pass through the lens and onto the image receptor. Stepper motor driver apertures have been and continue to be used in such aperture mechanisms, because of their simplicity and unique features. FIG. 1 is representative of the type of stepper motor aperture/shutter mechanism used in the Cameo Zoom™ (film) and DC-40™ (digital) cameras manufactured by Eastman Kodak Company.

An aperture mechanism with fixed aperture stops is often a multiple-bladed iris with blades that move to block light from entering a fixed aperture opening in the assembly. As shown in the exploded view in FIG. 1, a typical aperture mechanism 8 of this type includes a set of aperture blades 10 supported for movement within a housing 12 between upper and lower separators 14 and 16. An actuator ring 20 is connected by pins 20*a* through slots 14*a*, 16*a* in the separators 14 and 16 to the blades 10. This aperture assembly is fastened into the housing 12 by a retainer 18. A rack gear 20*b* on the actuator ring 20 mates with a pinion gear 22 on a stepper drive motor 24, which in turn is driven by an aperture controller 26 to several fixed positions. In operation, the stepper drive motor 24 rotates the actuator ring 20 to regulate the opening defined by the position of the blades 10. By closing completely, as shown in FIG. 1, this aperture mechanism can also provide a shuttering function (for which reason it is sometimes referred to as an aperture/shutter mechanism).

As further shown in FIG. 1, a lens 28 directs image light along an optical path 29 through the aperture mechanism 8 toward a photo receptor, in this case a photographic film 30 (although an electronic sensor, such as a charge-coupled device (CCD) could be used in place of the film). The film 30 is supported by a transport mechanism 32 such that a section thereof is presented in an image plane 34 of the optical section (the lens 28 plus the aperture mechanism 8). The aperture blades 10 thus regulate the intensity of the light that is allowed to strike the image plane 34. While shown as three separate movable aperture blades 10*a*, 10*b*, and 10*c*, an aperture mechanism may utilize more or fewer blades. For example; some conventional camcorders utilize one blade that moves with respect to a stationary stop. FIG. 2 shows the central parts of the three blades 10*a*, 10*b*, and 10*c* overlap to generate an aperture opening 11.

As further shown in FIG. 2, the blades 10 can move to multiple "stop positions" which allow more or less light to enter the camera. For example, the controller 26 commands the aperture position to change from stop A (FIG. 2A) to stop B (FIG. 2B). This movement enlarges the aperture opening 11 between the blades, while a movement from stop C (FIG. 2C) to stop B (FIG. 2B) closes the aperture opening 11. In each case the final designated aperture used for capture is nominally identical, yet the actual amount of light passing through the opening 11 in each case is different. This is due to backlash in the gears connecting the motor 24 to the blades 10*a*, 10*b*, 10*c*, or to friction in the assembly which acts to prevent the blades from reaching their intended destination, or to lack of friction which causes overshoot from the intended movement direction. Also, aperture openings may deviate from one another because of size and/or alignment differences of individual blades which comprise the aperture assembly.

For very small apertures (less than 2.0 millimeters in diameter) such as used in digital cameras, the bladed system becomes inherently inaccurate. This is due, at these small apertures, to the dominance of system backlash between the mechanical interfaces (e.g., between the gear teeth and the actuator ring 20, and the blades 10 and the actuator ring 20). This backlash, as described above, not only makes the desired aperture size inaccurate, but also depends on the direction of motion of the blades 10. With such small apertures, a markedly different aperture is formed when stepping out to the desired aperture than when stepping in to the same aperture. Lens systems that need a multitude of very small apertures do not have a desirable method of forming them accurately (without backlash), economically, and in a small package.

SUMMARY OF THE INVENTION

The present invention is directed to overcoming one or more of the problems set forth above. Briefly summarized, according to one aspect of the present invention, an aperture mechanism for controlling the aperture of an optical system includes a flexible diaphragm having an opening at its center for forming a first aperture value for the optical system and means for stretching the diaphragm to enlarge the opening and form at least one additional aperture value for the optical system. Additionally, a stepper motor may be used to stretch the diaphragm to form a plurality of additional aperture values for the optical system.

The stretched diaphragm aperture system forms different apertures by stretching a thin flexible diaphragm. The diaphragm has the smallest needed aperture pre-formed in its center. Because the size of the aperture is determined by how much the diaphragm is stretched, the backlash between the stepper motor and related gearing is kept to a minimum due to the elastic properties of the diaphragm. The design also provides economical and accurate control of very small apertures.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging devices employing film or electronic sensors are well known, the present description will be directed in particular to elements forming part of, or cooperating more directly with, apparatus in accordance with the present invention. Elements not specifically shown or described herein may be selected from those known in the art.

Figure 3:
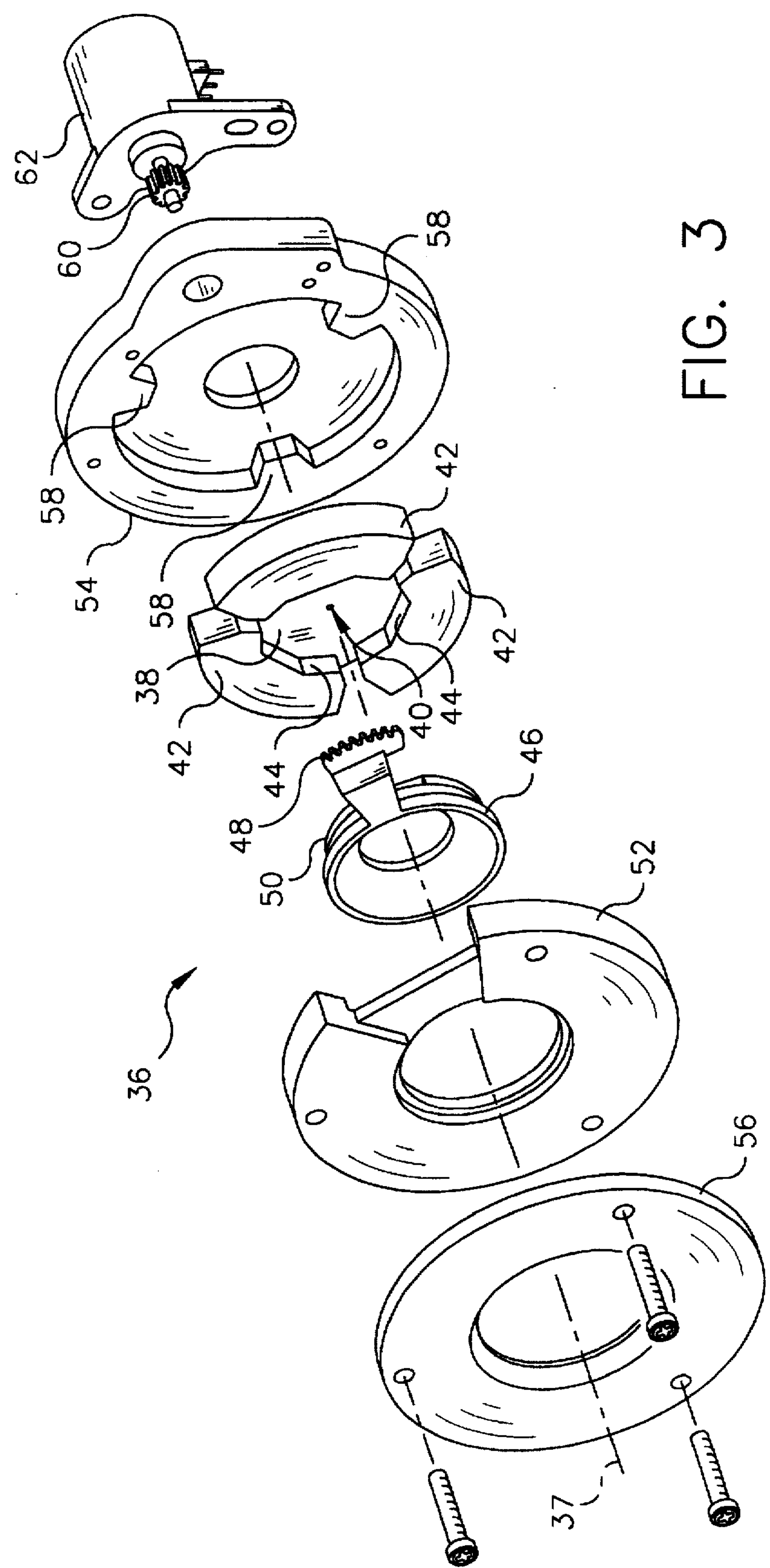
FIG. 3 is an exploded view of a stretched diaphragm mechanism according to the invention.

As shown in the exploded view in FIG. 3, an aperture mechanism 36 according to the invention includes a thin flexible opaque diaphragm 38 having an aperture hole 40 in its center aligned in an optical axis 37 of the aperture mechanism 36. The diaphragm can be formed of any opaque elastic material having a deformable quality such that it returns to its original shape, e.g., a urethane or silicone material impregnated with graphite has been used. The diaphragm 38 is supported at its edges by a set of cam driven stretch sliders 42, which are, e.g., molded onto the circumference of the diaphragm 38. Each slider 42 has a cam surface 44 on its inner edge. An aperture cam 46, with an attached ring gear 48, is assembled within the sliders 42 such that cam surfaces 50 on the aperture cam 46 engage the cam surfaces 44 on the sliders 42.

Figure 4:
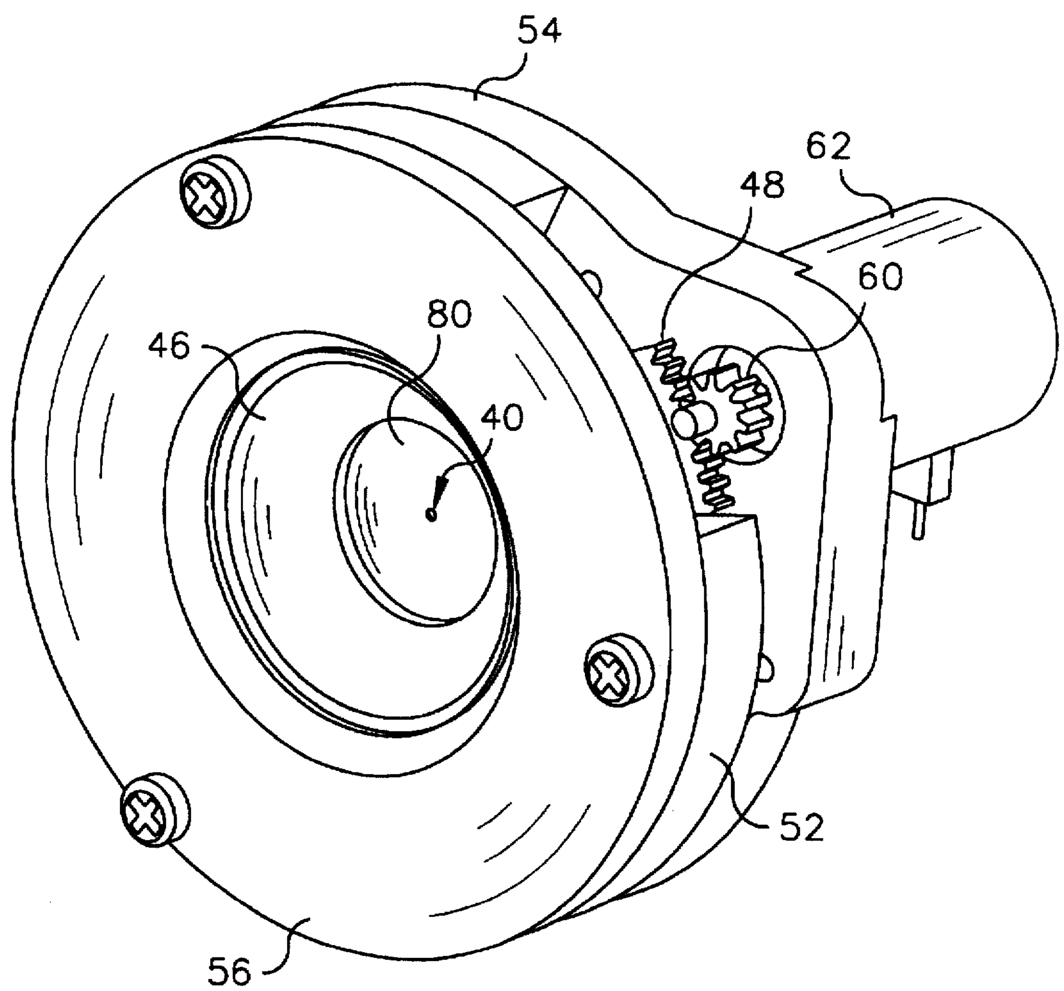
FIG. 4 is a view of the assembled diaphragm mechanism shown in FIG. 3.

The diaphragm 38, the sliders 42, and the aperture cam 46 are supported between a cam centering retainer 52 and a base housing 54. This aperture assembly is fastened into a base housing 54 by a top retainer cover 56. More specifically, the base housing includes feathers 58 for radially locating the stretch sliders 42 and preventing their rotation about the diaphragm center. As shown in FIGS. 5A to 5D, an open space 54' allows radial movement of the sliders 42 as they are cammed outward. Referring back to FIG. 3, the ring gear 48 on the aperture cam 46 mates with a pinion gear 60 on a stepper motor 62, which in turn is driven by an aperture controller of the type shown in FIG. 1 to several fixed positions. The entire mechanism, when assembled, forms the compact package shown in FIG. 4.

Figure 1:
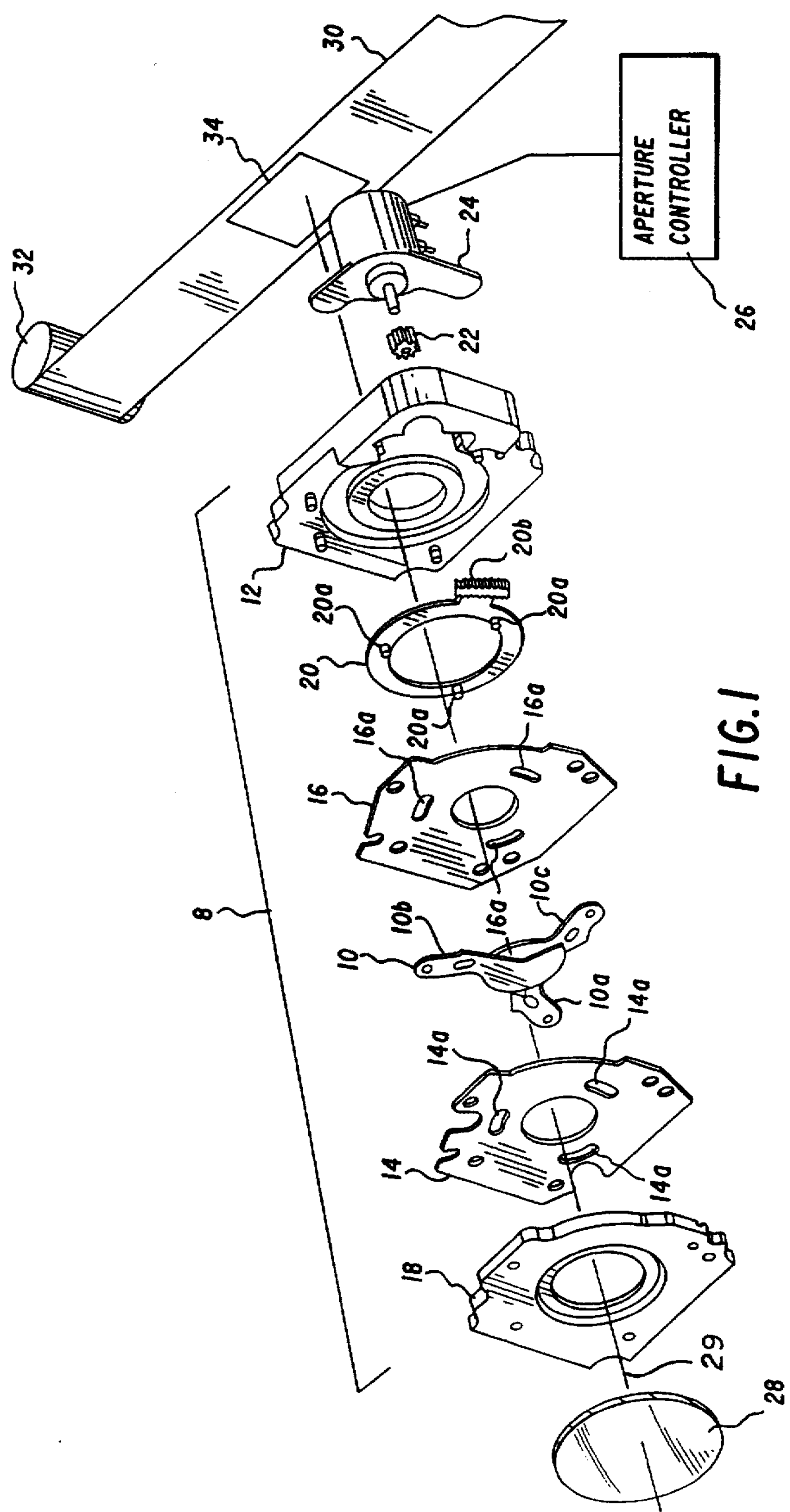
FIG. 1 is a diagram of a camera showing an exploded view of an aperture mechanism of the type known in the prior art.
Figures 2A, 2B, 2C:
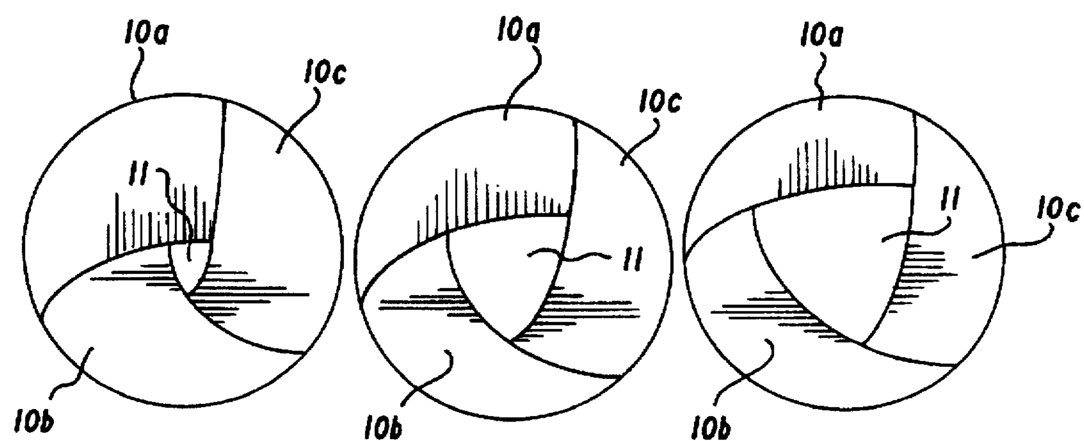
FIGS. 2A, 2B, and 2C are diagrams of different aperture openings provided by different positions of aperture blades included in the aperture mechanism shown in FIG. 1.

The operation of the aperture assembly is similar in some respects to the bladed type of aperture shown in FIG. 1. The main difference is that instead of the stepper motor moving blades to form the apertures, the thin opaque diaphragm 38 is stretched to form the different apertures. The thin diaphragm 38 has the smallest aperture pre-molded into it. Accordingly, the unstretched aperture hole 40 becomes the reference aperture and all larger apertures will be formed from this reference aperture by stretching. Molded onto the circumference of the diaphragm 38 are the sliders 42. These sliders are used to convert the rotary motion of the motor 62 and the aperture cam 46 into a stretching motion of the diaphragm 38. The cam 46 and the ring gear 48 are rotated by the stepper motor 62 and cause the sliders 42 to move radially outward within the base housing 54, thereby stretching the thin diaphragm 38. The cam retainer 52 is used to keep the aperture cam 46 centered and restrained in order for the motor 62 to properly rotate the aperture cam 46.

The base housing 54 is used to mount the motor 62 and to hold the opaque diaphragm 38. The feathers 58 in the housing 54 keep the diaphragm 38 centered and the sliders 42 from rotating. The feathers 58 also guide the sliders 42 in the proper radial direction when the aperture cam 46 is rotated to stretch the diaphragm 38. The tension (resistance to stretching) in the diaphragm 38 will keep the mechanical backlash in this aperture assembly near zero. This keeps the aperture size consistent with stepper motor position regardless of the direction needed to get to that position. The top cover 56 is used to keep all the components in their proper place.

Figure 5A:
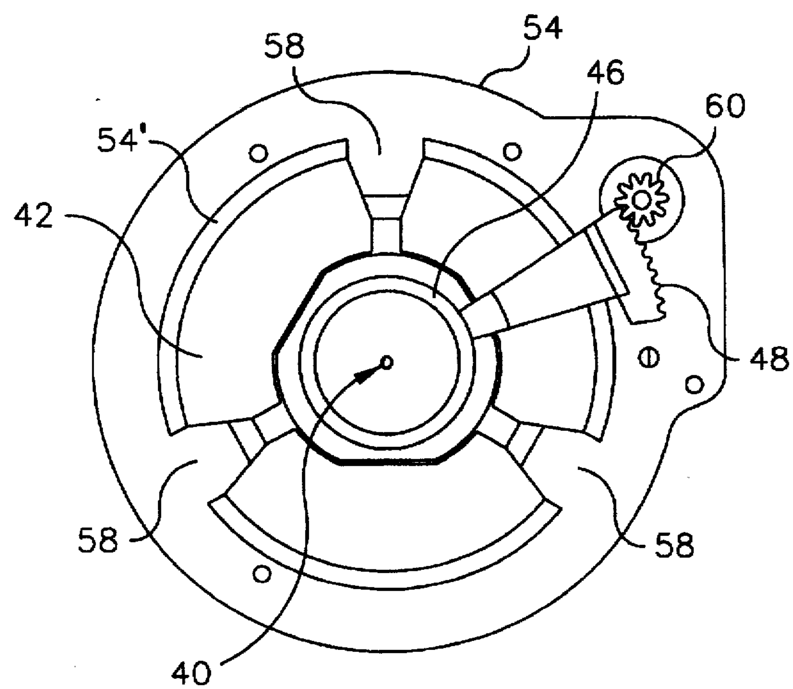
FIGS. 5A, 5B, 5C and 5D are diagrams of different aperture openings provided by different positions of the stretched diaphragm shown in FIG. 3.
Figure 5B:
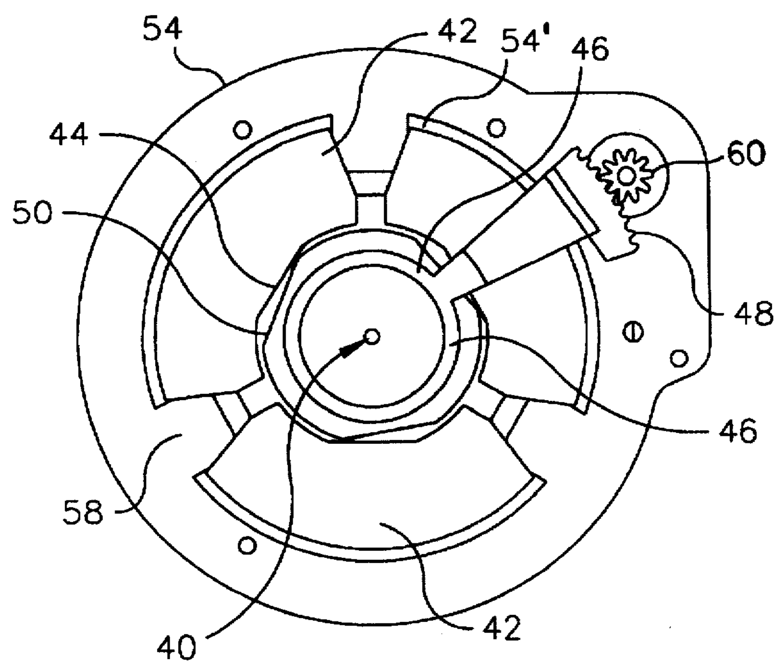

As further shown in FIGS. 5A to 5D, the flexible diaphragm 38 can move to multiple "stop positions" which allow more or less light to enter the camera. (Each view shows the flexible, opaque diaphragm 38 and its attached sliders 42 nested within 10 the base housing 54, as well as the cam surfaces 44 on the aperture cam 46). For example, the controller commands the aperture position to change from stop A (FIG. 5A) to stop B (FIG. 5B). The motor 62 rotates the aperture cam 46 and the cam surfaces 50 of the aperture cam 46 slide against the cam surfaces 44 of the sliders 42, thereby causing the sliders 42 to move radially outward alongside the feathers 58. Since the sliders 42 are attached to the diaphragm 38, this movement causes the diaphragm 38 to stretch and enlarges the aperture opening 40 at its center to the new aperture value. Similarly, a movement from stop B (FIG. 5B) to stop C (FIG. 5C) further enlarges the aperture opening 40, while a movement from stop C (FIG. 5C) to stop D (FIG. 5D) still further enlarges the aperture opening 40.

Figure 5C:
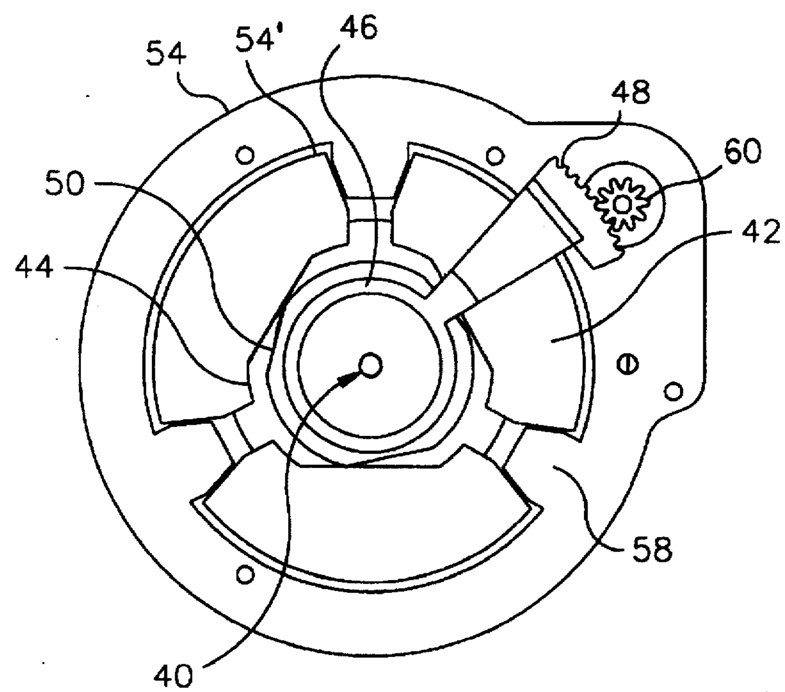
Figure 5D:
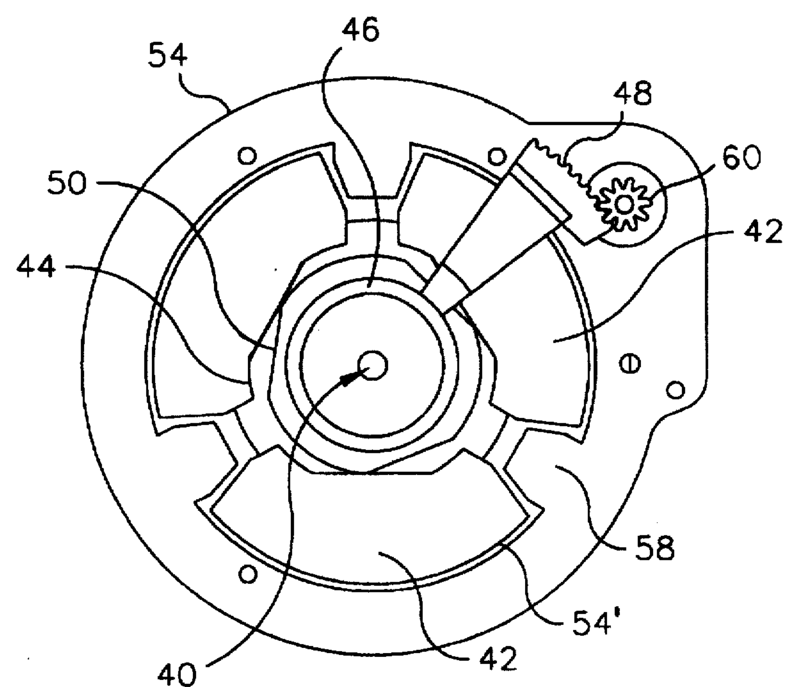

As the sliders 42 are cammed radially outward, tension in the opaque diaphragm 38 increases. The increasing tension in the diaphragm 38 also causes the camming surfaces 44 and 50 to remain firmly engaged. Consequently, as the aperture cam 46 rotation is reversed and the camming surfaces 50 move in the reverse direction, the tension in the diaphragm 38 draws the sliders 42 inward and the aperture hole 40 decreases, e.g., from stop D (FIG. 5D) to stop C (FIG. 5C). In this manner, backlash is removed and stop C (FIG. 5C) will be the same size whether it is arrived at by stretching the diaphragm from Stop B or relaxing the tension on the diaphragm from stop D.

In its basic concept, the stretched diaphragm aperture system forms different apertures simply by stretching a thin flexible diaphragm. The diaphragm has the smallest needed aperture pre-formed in its center. A stepper motor is further used to stretch the diaphragm to desired apertures that are larger than the smallest aperture. The size of the aperture is determined by how much the diaphragm is stretched. The backlash between the stepper motor pinion gear and cam gear is kept to a minimum due to the elastic properties of the diaphragm.

The invention has been described with reference to a preferred embodiment. However, it will be appreciated that variations and modifications can be effected by a person of ordinary skill in the art without departing from the scope of the invention.

PARTS LIST

8 aperture mechanism
10 aperture blades
**10*a,b,c*** movable blades
11 opening
12 housing
14 upper separator
**14*a*** a slot
16 lower separator
**16*a*** slot
18 retainer 20 actuator
20*a* pins
20*b* rack gear
22 pinion gear
24 drive motor
26 aperture controller
28 lens
30 film
32 transport mechanism
34 image plane
36 aperture mechanism
38 flexible opaque diaphragm
40 aperture hole
42 cam driven stretch sliders
44 cam surface
46 aperture cam
48 ring gear
50 cam surface
52 cam centering retainer
54 base housing
56 top retainer cover
58 feathers
60 pinion gear
62 stepper motor

We claim:

1. An aperture mechanism for controlling the aperture of an optical system, said aperture mechanism comprising:

a flexible planar diaphragm having a circular opening at its center for forming a first aperture value for the optical system; and means for stretching the diaphragm uniformly from its outer periphery to enlarge the opening and form at least one additional aperture value for the optical system.

2. An aperture mechanism as claimed in claim 1 further comprising a stepper motor for driving said means for stretching the diaphragm to form a plurality of additional aperture values for the optical system.

3. An aperture mechanism for controlling the aperture of an optical system, said aperture mechanism comprising:

a flexible planar diaphragm having a circular hole at its center for forming a first aperture opening for the optical system;

a supporting structure arranged around the periphery of the flexible planar diaphragm; and means acting on the supporting structure to uniformly enlarge the hole from its outer periphery and to form at least one larger aperture opening for the optical system.

4. The aperture mechanism as claimed in claim 3 wherein the supporting structure has a camming surface and said means acting on the supporting structure comprises a camming element for engaging the camming surface and camming the supporting structure outward from the center of the diaphragm so as to enlarge the hole and to form at least one larger aperture opening for the optical system.

5. An aperture mechanism as claimed in claim 3 further comprising a stepper motor for driving said means acting on the supporting structure for stretching the diaphragm to form a plurality of larger aperture openings for the optical system.

6. An aperture mechanism for controlling the aperture of an optical system, said aperture mechanism comprising:

a generally circular flexible planar diaphragm having a circular hole at its center for forming a first aperture opening for the optical system;

a plurality of supports arranged around at least a portion of the circumference of the circular flexible planar diaphragm; and means for forcing the supports radially outward from the center of the flexible planar diaphragm to stretch the diaphragm and uniformly enlarge the hole from its outer periphery, thereby forming at least one larger aperture opening for the optical system.

7. The aperture mechanism as claimed in claim 6 wherein each support has a camming surface and said means for forcing the supports comprises a camming element for camming the supports radially outward from the center of the diaphragm.

8. An aperture mechanism as claimed in claim 6 further comprising a stepper motor for driving said means for forcing the supports radially outward to stretch the diaphragm and form a plurality of larger aperture openings for the optical system.

9. An aperture mechanism for controlling the aperture of an optical system, said aperture mechanism comprising:

a flexible diaphragm having an opening at its center for forming a first aperture value for the optical system;

means for stretching the diaphragm to enlarge the opening and form at least one additional aperture value for the optical system; and a stepper motor for driving said means for stretching the diaphragm to form a plurality of additional aperture values for the optical system.

10. An aperture mechanism for controlling the aperture of an optical system, said aperture mechanism comprising:

a flexible diaphragm having a hole at its center for forming a first aperture opening for the optical system;

a supporting structure arranged around the periphery of the flexible diaphragm;

means acting on the supporting structure to enlarge the hole and to form at least one larger aperture opening for the optical system; and wherein said supporting structure has a camming surface and said means acting on the supporting structure comprises a camming element for engaging the camming surface and camming the supporting structure outward from the center of the diaphragm so as to enlarge the hole and to form at least one larger aperture opening for the optical system.

11. An aperture mechanism as claimed in claim 10 further comprising a stepper motor for driving said means acting on the supporting structure for stretching the diaphragm to form a plurality of larger aperture openings for the optical system.

12. An aperture mechanism for controlling the aperture of an optical system, said aperture mechanism comprising:

a generally circular flexible diaphragm having a hole at its center for forming a first aperture opening for the optical system;

a plurality of supports arranged around at least a portion of the circumference of the circular flexible diaphragm;

means for forcing the supports radially outward from the center of the flexible diaphragm to stretch the diaphragm and enlarge the hole, thereby forming at least one larger aperture opening for the optical system; and wherein each support has a camming surface and said means for forcing the supports comprises a camming element for camming the supports radially outward from the center of the diaphragm.

13. An aperture mechanism as claimed in claim 12 further comprising a stepper motor for driving said means for forcing the supports radially outward to stretch the diaphragm and form a plurality of larger aperture openings for the optical system.

* * * * *